R. B. HARTMAN.
MOLD FOR CONCRETE COLUMNS.
APPLICATION FILED MAY 19, 1908. RENEWED JULY 6, 1918.
1,295,310.
Patented Feb. 25, 1919.
7 SHEETS—SHEET 2.
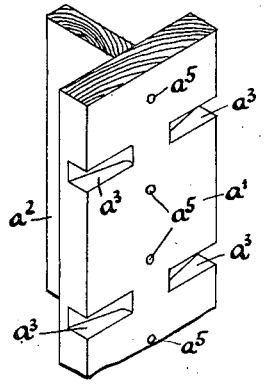
Fig. 5
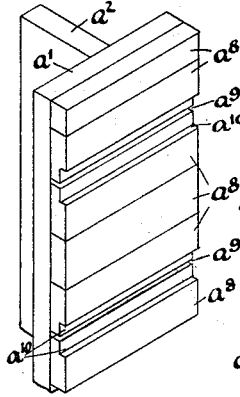
Fig. 6
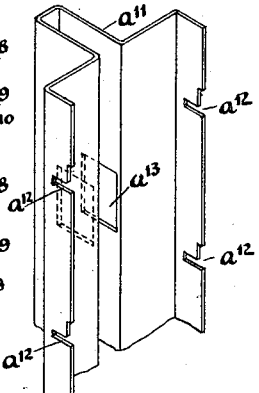
Fig. 7
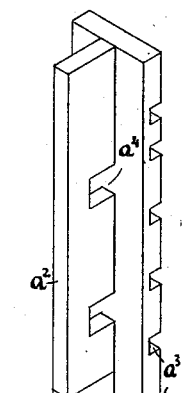
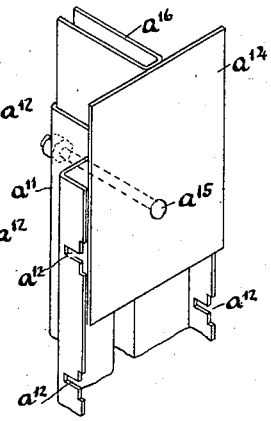
Fig. 8
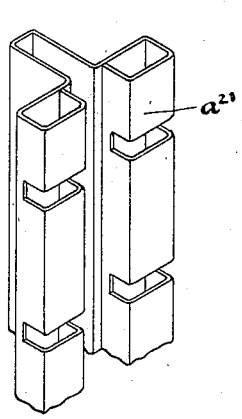
Fig. 9
Fig. 10
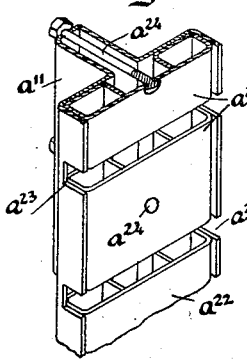
Fig. 11
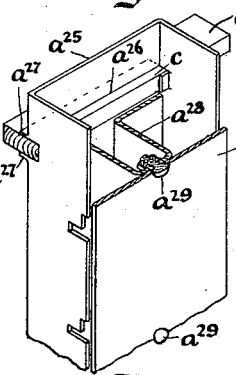
Fig. 12
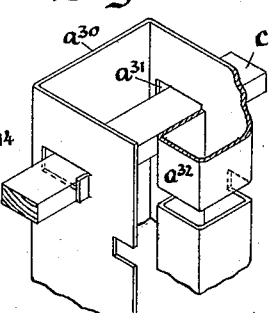
Fig. 13
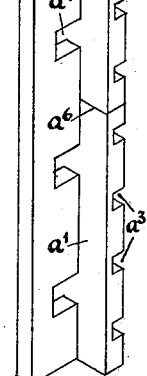
Fig. 14
Witnesses
Rudolph B. Hartman, Inventor
By
Attorney

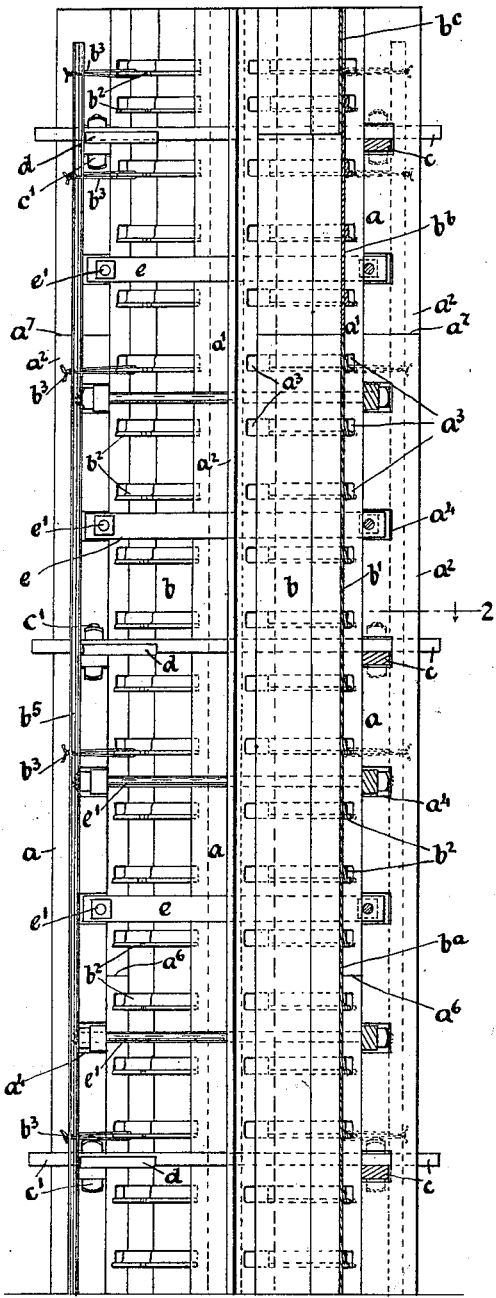
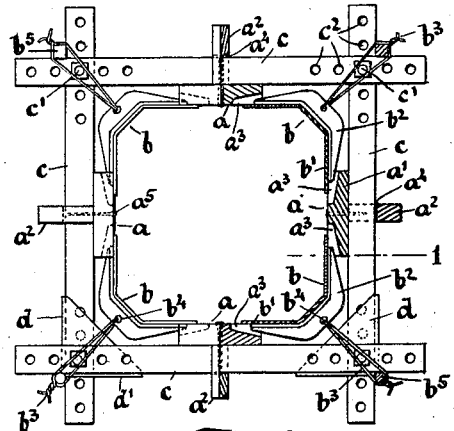
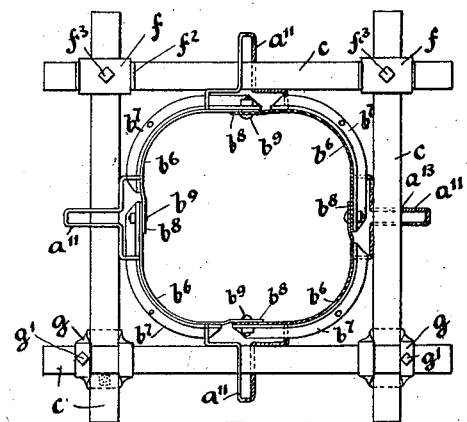
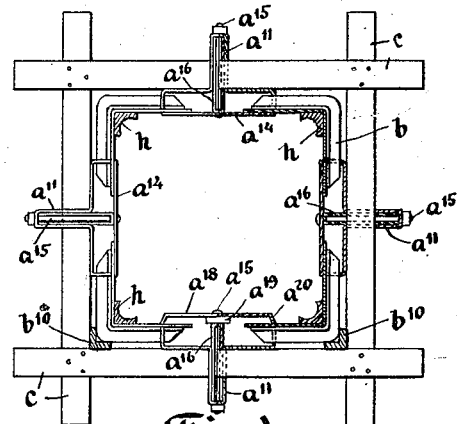

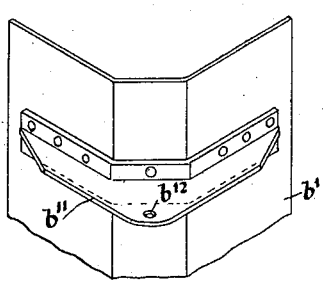
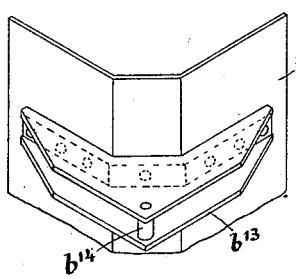
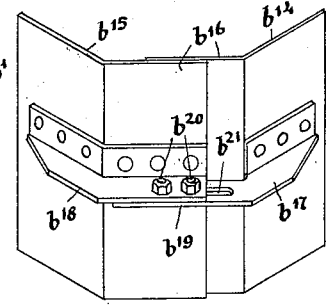
*Fig. 15*  *Fig. 16*  *Fig. 17*
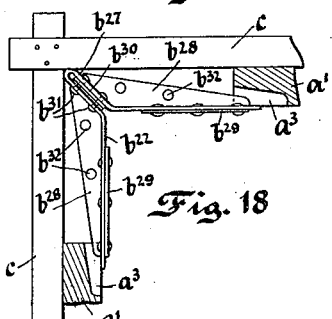
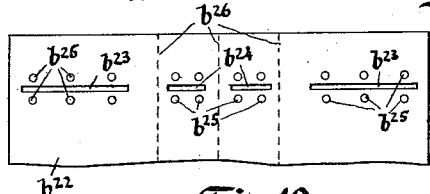
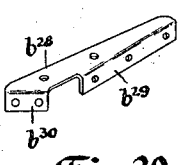
*Fig. 18*  *Fig. 19*  *Fig. 20*
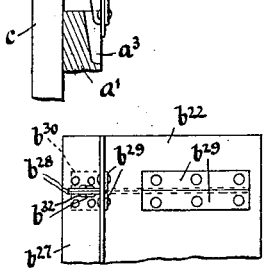
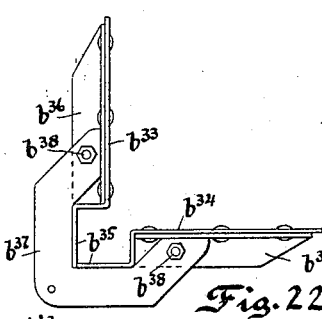
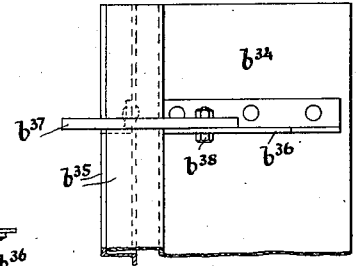
*Fig. 21*  *Fig. 22*  *Fig. 23*
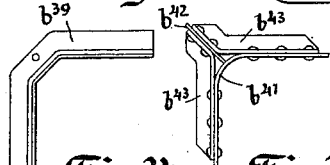
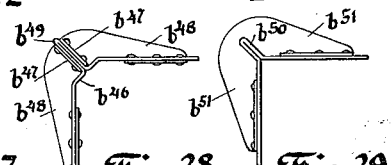
*Fig. 24*  *Fig. 26*  *Fig. 27*  *Fig. 28*  *Fig. 29*
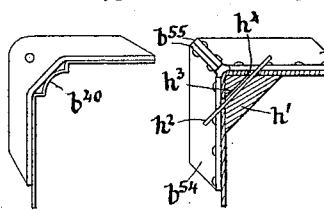
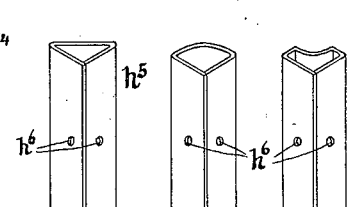
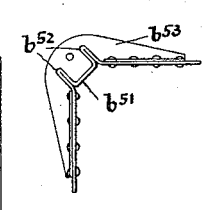
*Fig. 25*  *Fig. 31*  *Fig. 32*  *Fig. 33*  *Fig. 34*  *Fig. 30*

R. B. HARTMAN.
MOLD FOR CONCRETE COLUMNS.
APPLICATION FILED MAY 19, 1908. RENEWED JULY 6, 1918.

1,295,310.

Patented Feb. 25, 1919.

Rudolph B. Hartman, Inventor

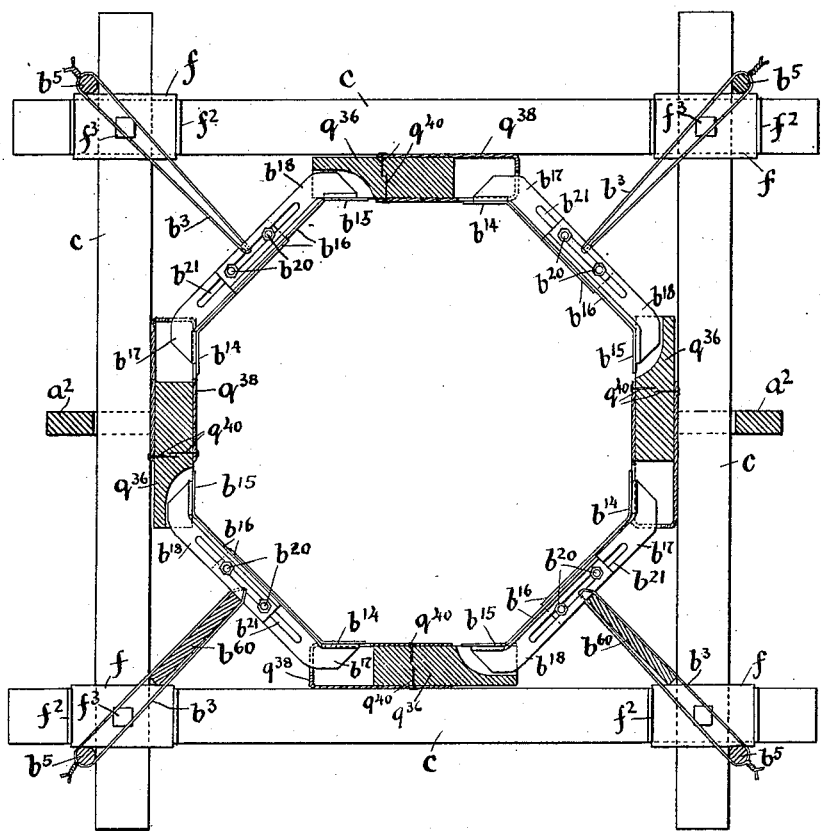
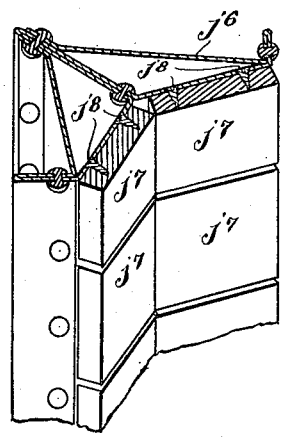
Fig. 68.
Fig. 58.

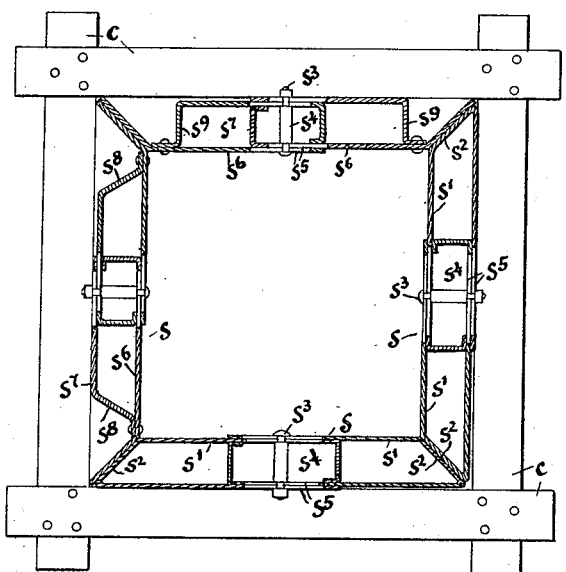
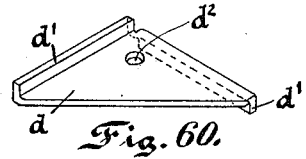
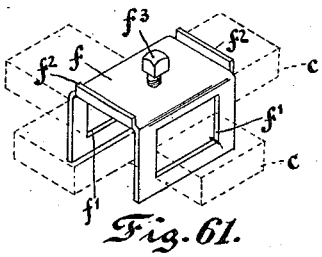
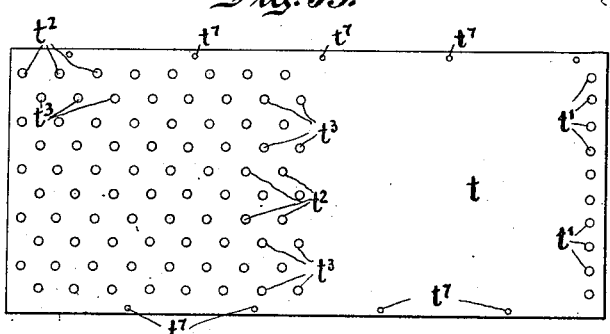
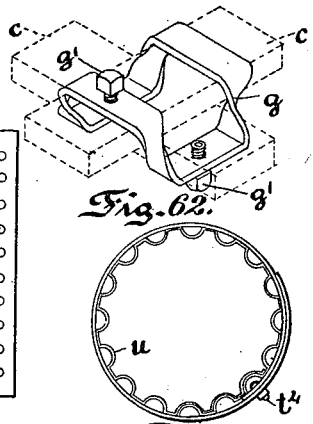
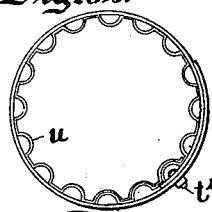
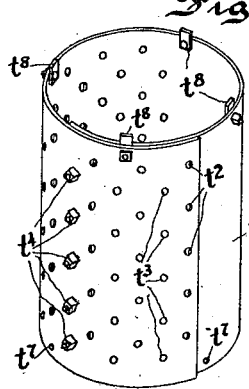
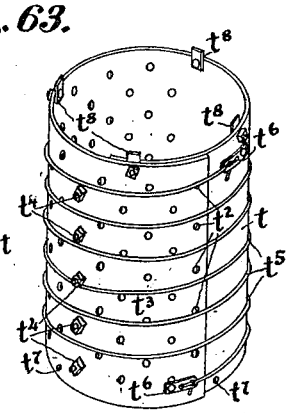
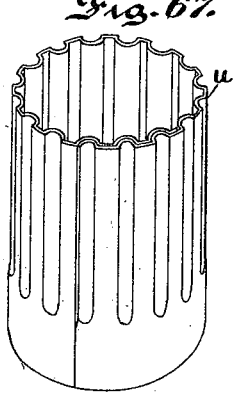

UNITED STATES PATENT OFFICE.

RUDOLPH B. HARTMAN, OF MILWAUKEE, WISCONSIN.

MOLD FOR CONCRETE COLUMNS.

1,295,310. Specification of Letters Patent. Patented Feb. 25, 1919.

Application filed May 19, 1908, Serial No. 433,667. Renewed July 6, 1918. Serial No. 243,703.

*To all whom it may concern:*

Be it known that I, RUDOLPH B. HARTMAN, of Milwaukee, Wisconsin, have invented Molds for Concrete Columns, of which the following is a specification.

This invention consists of improved forms for molding structural concrete, and it has for its general object to provide means whereby concrete buildings and other structures may be erected at a minimum of expense.

The erection of monolithic structures of concrete, reinforced or otherwise, involves, as is well known, the use of a set of forms or molds which are set up in position and the concrete poured therein. These forms or molds have heretofore been built up from wooden planks piece by piece especially for the individual building, and the construction of these molds has therefore been the most important item in the cost of such a building, on account of the amount of material and labor which it involves. After the concrete is set, the forms are pulled down and the whole material thus obtained is only in part usable for the next building, so that all of the labor, and a large part of the material, is chargeable to the cost of the one building in which they were used and contribute to the first cost thereof. If this great expense could be avoided by means of adjustable molds, which can be adjusted for all kinds of different forms and can be used over and over again for successive buildings, or successive floors of the same building, all of the material and a large part of the labor heretofore necessary for erection will be dispensed with and the construction cheapened accordingly.

It is the main object of this invention therefore to provide a set of adjustable molds which will fulfil this purpose. Moreover I not only design to provide standard molds, but provide molds constructed largely or wholly of sheet metal, which has the advantages over wood of durability, cheapness, smoothness of finish and ease of separating the forms from the concrete after the latter is set. I design, in short, to provide metal molds usable for every part of a building, where possible: but my present application is confined to the construction of such molds for columns, as my copending application No. 422,537, filed March 21, 1908, is confined to forms for floor and roof work.

My novel molds for columns present, in addition to the above mentioned features of adjustability, durability, and ease of erection and removal, certain subsidiary advantages which will appear in the sequel.

One of the basic features of my invention consists in providing column forms built up of four side-pieces and four corner pieces which are mutually adjustable to fit columns of any size within the capacity of adjustment; and, in general, the combination of wood and metal in such construction. In connection with this feature of the adjustable corner-pieces, I may provide varied shapes of the corners giving rounded, paneled, beaded, and other ornamental effects in a great variety of patterns as may be desired.

Another feature of my invention consists of the adjustable rounded corner-forms to accommodate different diameters of round columns; and in this connection I may provide ribbed and other ornamental forms so as to provide for fluted columns and the like. Another feature of my invention, which is an extension of the square column-form, consists of my octagonal column-form, which is also made up of eight sections, four alternate pieces of which slide within the other four, but each of said sections is or may be angle section having the octagon angle of 135 degrees.

Another feature of my invention consists of corner-insets which I may use in conjunction with the square column-form for the purpose of making ornamental corners, instead of special corner-pieces the corners of which are made ornamental. By these means I provide for producing all kinds of shapes from one set of column forms by simply inserting various shapes of corner-insets therein.

As an extension of the last-named feature I provide adjustable corner-insets for making octagonal columns, said corner-insets being adapted to assume different widths whereby they can be adjusted to any size of octagonal column with eight equal sides; whereby I am enabled to make octagonal columns not only with the same set of square forms which I use with other columns, but also with the same set of corner-pieces for all sizes of octagonal columns within the limits of their capacity.

Other features of my invention will appear from the following description thereof taken in connection with the accompanying drawings and are specifically set forth in the claims.

Referring now to the drawings,

Figure 1 is, as to the left-hand half, a side elevation, and as to the right-hand half, a longitudinal section on the plane 1 of Fig. 2, of a complete adjustable column-form constructed according to my invention.

Fig. 2 is, as to the left-hand half, a plan view, and as to the right-hand half, a transverse section on the plane 2, through said column.

Fig. 3 is a similar plan-view and section of a somewhat differently arranged column-mold.

Fig. 4 is a second alternative form of the column-mold.

Figs. 5 to 13 inclusive are perspectives of portions of different forms of side piece for the column-mold.

Fig. 14 is a perspective from the rear of a side-piece for the column-mold as shown in Fig. 1.

Figs. 15 and 16 are rear perspective views of portions of two different forms of corner-piece.

Fig. 17 is a similar view of a sectional adjustable corner-piece.

Fig. 18 is a plan view showing an alternative form of corner-piece.

Fig. 19 is a plan of a portion of the metal sheet used in the corner-piece shown in Fig. 18, before being folded.

Fig. 20 is a perspective of the gusset used in the same form.

Fig. 21 is a fragmentary side elevation of the same form.

Fig. 22 is a plan of a sectional corner-piece especially designed for panel-columns.

Fig. 23 is a fragmentary side elevation of the same.

Figs. 24 to 31 inclusive are plan views of different forms of corner-pieces, the last-named figure showing a corner-inset with method of holding it in place.

Figs. 32 to 34 inclusive are perspectives of different shapes of corner-inset.

Figs. 35 to 37 inclusive are transverse sections through corner-insets *in situ* showing the method of varying the size of the inset by a plurality of units of the same form.

Figs. 38 to 48 inclusive are transverse sectional views of different forms of adjustable or expansible corner-inset.

Fig. 49 is a plan showing adjustable extension-plates for the upper end of a column used with any of the insets shown in the preceding eleven figures.

Fig. 50 is a plan-section through an alternative form of the same.

Fig. 51 is a diagonal cross section through one corner of a column-form to show the arrangement by which the length of the form is varied to fit any given length of column, same being taken on the plane 51 of Fig. 45.

Figs. 52 to 57 inclusive are transverse sectional views of different forms of my special octagonal column-mold.

Figure 53:
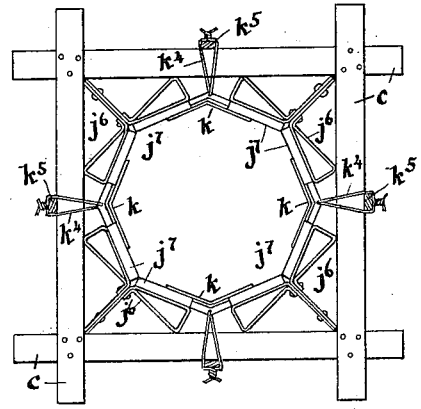

Fig. 58 is a perspective view of the form of corner-piece for the octagonal column shown in Fig. 53 on a larger scale, of slightly altered design.

Fig. 59 is a transverse section through a column-mold constructed according to the adjustable-plank system without corner-pieces.

Fig. 60 is a perspective of the special gusset-piece used for holding the frame-bars at right angles.

Figs. 61 and 62 are perspectives of two different forms of clamp for the frame-bars.

Fig. 63 is a plan of the developed sheet for my special circular column-form.

Fig. 64 is a perspective of the same rolled up.

Fig. 65 shows the manner of strengthening the same for the lower sections of column-forms.

Fig. 66 is a perspective of an inset-sheet adapted for forming fluted columns; and Fig. 67 is a plan of the same.

Fig. 68 is a view similar to Fig. 2 on a larger scale showing the combination of adjustable sides and corner-pieces as illustrated in Fig. 17.

In these drawings every reference letter and numeral refers always to the same part.

Referring first to the column-mold shown in Figs. 1 and 2, said column-mold is made up of eight principal parts, to wit, four side-pieces $a$ and four corner-pieces $b$; together with a plurality of frame-bars $c$ secured together at right angles in sets of four. The form of Figs. 1 and 2 is the combined wood and sheet-metal construction, the side-pieces $a$ consist of wooden planks $a'$ set flatwise to the side of the column and backing-planks $a^2$ set edgewise thereto in T-fashion so as to strengthen the same. The corner-pieces $b$ are made up of sheets of metal $b'$ bent at an angle and rigidly held in this position by stiffening-flanges $b^2$ secured to their backs; and said flanges may be made up either of sheets of iron or of angle-, T-, or channel-bars, or in any other manner so that they fulfil the function described. The planks $a'$ of the side-pieces are provided with a series of transverse slots $a^3$ in their faces to enable the flanges $b^2$ to slide therein, so that the ends of the sheets $b'$ rest upon the faces of the planks $a'$ thus supporting them against internal pressure.

The frame-bars $c$ are passed through holes or notches $a^4$ which are cut out of the inner edges of the backing-planks $a^2$, these latter being secured to the face-planks $a'$ by any suitable means, as by nails $a^5$. The frame-bars $c$ receive the bursting stresses due to hydrostatic pressure from within when the concrete is poured and should be sufficiently rigid to resist bending and firmly secured together at the ends. They may be secured together in different ways, the method shown in Figs. 1 and 2 being by passing bolts $c'$ through one of the series of holes $c^2$ in their ends, said holes being spaced at intervals of one to two inches corresponding to differences in successive sizes of columns. While the hydrostatic pressure of the concrete exerts no distorting force upon the rectangular form of the bars $c$, it is necessary to hold them positively at right angles while the forms are being set up; therefore I apply means such as triangular gusset-plates $d$ to any two adjacent corners. One of these gusset-plates is shown in Fig. 60 and as shown has flanges $d'$ on opposite sides and edges, and a hole $d^2$ at the right-angle corner in position to receive the bolt $c'$. The flanges $d'$ catch the edges of the bars $c$ and prevent the angle from expanding, so that the use of two on adjacent angles holds the angular position rigid.

The corner-pieces $b$ are supported vertically by the flanges $b^2$ thereof which rest against the edges of the notches $a^3$. They may be held in position against falling inward while the forms are being set up by means of tie-wires or cords $b^3$ which are looped through holes $b^4$ in the flanges $b^2$ and around longitudinal rods $b^5$ set in the corners of the frame-bars.

Instead of some of the frame-bars $c$ other clamping devices, such as ordinary clamping-bars $e$ in connection with bolts $e'$ may be used, these clamping-bars being connected by said bolts in pairs and positioned alternately on opposite sides of the column; in Fig. 1 all of the frame-bars are so replaced except three, at the top, middle and bottom respectively.

The arrangement as above described provides for adjusting the column laterally to any given size within certain limits; the vertical adjustment is as follows: Columns in buildings vary in length between certain limits, ordinarily from 8 to 16 feet. The builder will have side pieces and corner-pieces of different lengths on hand, the maximum length being that of the minimum columns, say eight feet, and others of say four feet, two feet and one foot lengths; from these he can make up the desired length to the nearest number of whole feet. Uneven inches, which are left at the top of the column, are provided for by making the top corner-piece slide inside the one next below it. Thus for example, in Fig. 1 the column may be supposed to be ten feet six inches in length; this is built up by a corner-piece $b^a$, of minimum column length eight feet, a piece $b^b$ of two feet in length on top of it, and a piece $b^c$ of one foot length which slides within the piece $b^b$.

For the side-pieces $a$ the same arrangement can be adopted, except of course as to the telescoping feature which does not apply; hence in this case a special piece must be cut to the exact length to fill up the uneven inches at the top. The preferable arrangement however, is that shown in Fig. 1, which consists in cutting from regular prepared lengths of plank a long piece and a short piece of the facing-plank $a'$ and the same lengths of the backing-plank $a^2$; the two pieces when placed end to end being equal to the exact length of column wanted. The short piece of the facing-plank is placed at the bottom of the column, and of the backing-plank at the top, the division-lines being shown at $a^6$ and $a^7$ respectively (see Fig. 14). If the notches $a^3$ and holes $a^4$ are not found in the right places they are readily cut out with a saw.

Although a portion of the recesses $a^3$ will generally be exposed to filling with concrete, they are so small that the leakage will be inconsequential; they soon become blocked by the aggregating material in the concrete, and when the forms are taken down any concrete-lugs left projecting on the column are knocked off without difficulty. Instead of the notches $a^3$ I may use the form of side-pieces shown in Fig. 6, in which the face-plank $a'$ is not notched, but has secured thereto an independent facing $a^8$ of cross planks which are separated by intervening spaces $a^9$ in the nature of grooves which extend all the way across, these grooves being spaced at a distance equal to the spacing of the flanges on the corner-pieces, and destined to receive the latter. In Fig. 6 also the grooves $a^9$ are flanked by lateral rabbets $a^{10}$, which in this case receive the flat sides of T-shaped flanges such as are shown for example in the corner-piece illustrated in Fig. 15. The grooves $a^9$ are too narrow to permit any perceptible leakage of the concrete, and any which may run into the grooves is broken off from the column and left in the form when the latter is taken down.

The form of the side-pieces and corner-pieces may be varied within wide limits and a number of advantageous forms of the same are here presented. The corner-pieces may be square, chamfered, beaded, rounded, or the like in accordance with the form of column desired. In Fig. 3 is shown a column-mold having sheet-metal side-pieces $a^{11}$ and rounded corner-pieces $b^6$. The sheet-metal corner-pieces here shown are in simple T-trough form, which is illustrated in perspective in Fig. 7, thus following the outline of the wooden pieces $a$ of Fig. 2 They have cut in their side-edges angle- or T-shaped notches $a^{12}$ in which the flanges $b^7$ of the corner-pieces slide. In the narrow back-portion of the side pieces are cut holes $a^{13}$ through which pass the frame-bars $c$. The corner-pieces shown in Fig. 3 differ from those of Fig. 2 in several ways. Each corner-piece is substantially of quarter-cylindrical outline, whereby a substantially cylindrical or round column can be formed of varying diameter, although of course said column will not be exactly cylindrical except for a certain size of column. One end of each section is provided with a sheet-metal extension $b^8$ which overlaps the end of the adjacent section and is secured thereto by bolts $b^9$ which pass through slots in the flap $b^8$. Thus the four corner-pieces are united together independently of the side-pieces and the frame-bars $c$ and completely inclose the column. This figure shows also a different means of adjustably securing frame-bars $c$ together whereby they are held at right angles and also in the proper position for different-sized columns; said means comprising clamps $f$ or $g$ of which two forms are shown. The clamp $f$ comprises simply a sheet of metal bent into channel-shape with apertures $f'$ in the two limbs of the channel to receive one crossbar while the width of the channel is properly proportioned to receive the other crossbar fitting in over the first. The ends of the middle member of the channel are turned up as at $f^2$ to form stiffening flanges, and a screw $f^3$ is threaded into a hole in the center. By merely turning up the screw $f^3$ after the two frame-bars $c$ are properly brought together, they are tightened in position, the force depending on the amount of screwing up. The clamp $g$ consists of an endless metal strap which as shown has four laps engaging alternately over one crossbar and under the other, and screws $g'$ are threaded into the middle of two adjacent laps so as to bite into the ends of the respective bars. Either of these clamps will hold the two bars in angular position as well as against pulling out.

Fig. 4 shows a third form of column-mold, in which the side-pieces $a^{11}$ are the same as in Fig. 3, but, with the addition of a facing-plate $a^{14}$ which extends the complete width thereof and is secured to the backing $a^{11}$ by means of bolts $a^{15}$ passing from front to back in the center of a narrow channel $a^{16}$ which telescopes within the narrow part of the back-piece and acts as a support for the plate $a^{14}$ against hydrostatic pressure. This form is illustrated in Fig. 9, which shows also the manner in which this side-piece can be varied in length by displacing the face-plate $a^{14}$ longitudinally on the back-piece $a^{11}$ to any desired extent. This adjustment however is only intended to take care of the uneven inches less than a foot at the top of a column. The plain metal side-piece of Fig. 7 can be adjusted longitudinally by having a similar piece $a^{17}$ slightly smaller and sliding within the same, as shown in Fig. 8. The corner-pieces shown in Fig. 4 are of square angular pattern and their ends in this case are made to slide under the facing-plates $a^{14}$; wherefore they are held in place by the plates $a^{14}$, and temporary securing means like the wires $b^3$ are unnecessary. In Fig. 4 are also shown beaded insets $h$ set in the corners whereby a bead-cornered column is made. If a panel-column is desired, it is only necessary to replace the plates $a^{14}$ by channel-pieces $a^{18}$ secured to the channels $a^{16}$ in the same manner as shown at one side of Fig. 4, except that spacing-blocks $a^{19}$ are inserted below the heads of the bolts to provide for the increase in depth of the side-piece. The end-flanges $a^{20}$ are preferably made slightly oblique to assist in withdrawing the form from the concrete after it is set. Means should be provided in all of the forms for resting the angles of the corner-pieces against the supporting-frames or clamping-bars, and thus taking the bending-strain off the corner-pieces. Such means are angle-bars $b^{10}$ which rest in the corners of the frames and extend the entire length of the column. They are shown only in Fig. 4, but it is desirable to use similar rests in all the forms and they are omitted from the drawings in order to avoid too great complications in the views.

Fig. 10 shows in perspective an alternative form of side-piece which may be used instead of the form of Fig. 7, being stronger than the latter. This form is provided with boxed ends $a^{21}$ turned over upon the center.

In Fig. 11 is shown an alternative form which may be used instead of Figs. 7 or 10. In this case a series of separate boxed sheet-metal pieces $a^{22}$ of a height equal to the distance between the slots $a^{23}$ which receive the flanges of the corner-pieces, are bolted to the backing-pieces $a^{11}$ by means of central bolts $a^{24}$.

It is not necessary to my invention that the sheet-metal side-pieces should be of T-trough structure, as they may be of simple channel-shape as illustrated for example in Figs. 12 and 13. The former shows a box $a^{25}$ of rectangular form, the narrow backwardly projecting portion being omitted, and in this case a slot $a^{26}$ is cut in the back to receive the frame-bar $c$, the edges of said slot being turned up to form ears $a^{27}$ which assist in holding said bar $c$. The plate $a^{14}$ can be used in this form being supported by a hat-shaped sheet $a^{28}$ secured thereto by bolts $a^{29}$. In Fig. 13 the box $a^{30}$ which constitutes the side-piece is made so deep that the frame-bar $c$ passes through holes $a^{31}$ in the sides thereof. On one side of the box are shown boxed-ends $a^{32}$ similar to those of Fig. 10, which ends may or may not be used.

It will be readily understood that the different forms and pieces are largely interchangeable, and the longitudinal adjustment by telescoping is applicable to most of the sheet-metal forms.

Figs. 15 to 31 inclusive illustrate various forms of corner-pieces which may be used in the column-mold as constructed according to the design of Figs. 1 and 2. In Fig. 15 the stiffening flange is of T-shaped section provided with a hole $b^{12}$ through which the wire $b^3$ may be passed, the corner being shown as beveled in this instance. In Fig. 16 there is a double or channel-shaped stiffening flange $b^{13}$, provided with a pin $b^{14}$ at the apex for the same purpose. The form of Fig. 17 is adapted for columns with variable corner bevel, and the sheet is made in two parts $b^{14}$, $b^{15}$, each provided with a beveled portion $b^{16}$, the two beveled portions overlapping as shown; and the stiffening flange is also made in two parts $b^{17}$, $b^{18}$, the former of which has a free tongue $b^{19}$ sliding upon the latter and secured thereto by bolts $b^{20}$ passing through the adjusting-slot $b^{21}$.

A very desirable form of corner-inset is shown in Figs. 18 to 21, this being extremely strong and light and made with a minimum of metal, because the metal used therein can be made thinner. In Fig. 18 it is shown in plan in position between the side-pieces $a$ and frame-bars $c$. This corner-piece is made up of a sheet $b^{22}$, which is shown developed in Fig. 19, and is cut with slots $b^{23}$, $b^{24}$, and punched with rivet holes $b^{25}$ adjacent thereto, and is then folded on the dotted lines $b^{26}$ so that the middle portion forms a longitudinal stiffening-rib $b^{27}$, which as shown in Fig. 18 preferably is of such width that it rests upon the frame-bars $c$, in other words the width of the rib 27 is 1.41 times that of the plank $a'$. The corner-piece is stiffened laterally by gussets $b^{28}$ which have tabs $b^{29}$. $b^{30}$ extending through the slots $b^{23}$, $b^{24}$ respectively and riveted to the sheet $b^{22}$ through the holes $b^{25}$. The rivets $b^{31}$ through the rib of the sheet pass also through the two abutting tabs $b^{30}$ of the gusset, and where two gussets are used together as shown in Fig. 21, these have their tabs folded in opposite directions and are secured in the middle by rivets $b^{32}$. The longitudinal rib $b^{27}$ permits the stiffening gussets to be set farther apart than the flanges where no longitudinal rib is used, and the passing of the tab $b^{29}$ through the sheet make a stronger joint and also permits the slots $a^3$ to be made simple narrow saw-cuts, as there are no flat flanges projecting on the outside of the sheet.

In Figs. 22 and 23 is shown another form of sectional corner-piece which is adapted to panel columns. A panel-column could not be formed with a one-piece corner-piece (except as shown in Fig. 4) because there would be no way of removing the corner-piece after the concrete was set. I therefore make the sheet in two pieces $b^{33}$ and $b^{34}$, each of which has an offset $b^{35}$ and which meet at the edge. Each is provided with stiffening-flanges $b^{36}$ and a removable yoke $b^{37}$ which has its two limbs secured to the respective flanges $b^{36}$ by bolts $b^{38}$, said yoke holding the two sheets in proper relation during the pouring of the concrete.

Fig. 34 shows a plain corner-piece with beveled corner, the same substantially as shown in Fig. 2 except that the stiffening flange $b^{39}$ is made of a simple angle or T-bar of uniform width and extends all the way to the edge of the sheet. This form is especially usable with the forms of side-piece shown in Figs. 6 and 9. Fig. 25 shows a similar form in which the corner of the sheet is molded into a bead $b^{40}$. Fig. 26 shows a form with rounded corner $b^{41}$ and rigidified by a longitudinal web-plate $b^{42}$ riveted between two angle or T-bars $b^{43}$. Fig. 27 shows a beveled form provided with a T-bar $b^{44}$ as longitudinal rib and gussets $b^{45}$ riveted thereto. The form of Fig. 28 is constructed similar to Fig. 18 except that it has a beveled corner $b^{46}$ and except also that the tabs $b^{47}$ of the gussets $b^{48}$ are riveted to the longitudinal fold $b^{49}$ on the outside instead of on the inside. In Fig. 29 the sheet has also a longitudinal fold $b^{50}$ for a rib, and instead of the gussets a wide stiffening-plate $b^{51}$ is provided extending entirely around the fold $b^{50}$, being cut to receive it as shown; no rivets are shown in the stiffening rib $b^{50}$, as these are unnecessary since the pressure from within tends to force the folds of the rib together. In Fig. 30 the sheet is provided not only with a beveled corner $b^{51}$ but with a double longitudinal fold $b^{52}$ and a stiffening plate $b^{53}$ embracing both. This form is stronger than the sheet shown in Fig. 28, for the same thickness of metal, and requires no more metal since the folds $b^{52}$ may be made narrower than the fold $b^{49}$ of Fig. 28. Fig. 31 shows two angle-bars $b^{54}$ used as stiffening flanges, said angle-bars being cut off obliquely at their abutting ends and having tabs $b^{55}$ turned up and riveted together, thus forming a short longitudinal stiffening rib.

The rivets uniting the corner-pieces to the flanges, gussets, stiffening-plates, etc., are shown in the figures in general with projecting heads in order to better illustrate their position; but it is preferable to make them with countersunk heads so that they will not interfere with the flush setting of the corner-piece upon the side-pieces and the inset upon the corner-piece.

Fig. 31 also shows the means by which I may make a column-mold vary in style of corners by appropriate insets. Beaded insets are used in Fig. 4, whereas Fig. 31 shows plain beveled insets $h'$. As means of securing them in place while the form is being set up I may pass a rod or wire $h^2$ through a transverse hole $h^3$ in the inset and small holes $h^4$ in the corner-piece sheet. The inset can be made of wood and therefore solid, as shown in Figs. 4 and 31, or it can be of sheet-metal as shown in Figs. 32 to 34, which show respectively a beveled, plain-concave, and plain-bead inset.

Figs. 35 to 37 show a single triangular or beveled inset $h^5$ which may be used to form beveled corners of different sizes by uniting them together, and further these figures show means of securing the insets in place by means of the cord $b^3$ which is made to pass through the holes $h^4$ in the corner-sheets and through holes $h^6$ formed at proper intervals in the insets.

I design however to make a corner-inset which shall be adjustable by use of the square column mold with the use of insets, and without making up a different set of insets for every different set of columns. This may be done in various ways as shown in Figs. 38 to 51 inclusive. In Fig. 38 I utilize two of the triangular or plain bevel forms $h^5$ in conjunction with a facing-plate $h^7$ and an intermediate backing-piece $h^8$ which latter may be a plank of the proper width so that by varying the width of the plank $h^8$ the width of the inset is varied correspondingly. This however has but limited applicability. A better form is shown in Fig. 39, in which the plate $h^7$ is secured to transverse blocks $h^9$ which may be cut to any length and form struts for holding the pieces $h^5$ at the desired distance; to these may be added an edge-plank $h^{10}$ which has one or more holes $h^{11}$ therein, through which passes the cord $b^3$.

Fig. 40 shows an inset of universal adjustability, the same being made up of three flat plates $h^{12}$, $h^{13}$, and $h^{14}$ and an angle-plate $h^{15}$. Said three flat plates have slots $h^{16}$, $h^{17}$ and $h^{18}$ respectively through which and through appropriate holes in the angle-plate $h^{15}$ pass bolts $h^{19}$, $h^{20}$. The plates $h^{12}$ and $h^{13}$ can be moved to any relative position to give the desired width of inset, and the plate $h^{14}$ is moved correspondingly so that it will rest in the angle of the corner-piece.

The same idea is shown in a somewhat different form in Fig. 41 in which the inset is made up of a pair of overlapping-plates $h^{21}$, another pair of plates $h^{22}$ and a pair of triangular plates $h^{23}$. The plates $h^{21}$ have slots $h^{24}$ receiving bolts $h^{25}$ which clamp them to the flanges $h^{26}$ on the plates $h^{23}$, allowing lateral adjustability; while the plates $h^{22}$ are similarly clamped between the plates $h^{23}$ by bolts $h^{27}$ passing through the flanges $h^{28}$ and through slots $h^{29}$ in said plates. Each of the plates $h^{21}$ may have a rest-flange $h^{30}$ on its free edge and each of the plates $h^{22}$ a similar flange $h^{31}$.

In Fig. 42 the inset is composed of only two plates $h^{32}$ which have slots $h^{33}$ through which pass bolts $h^{34}$ clamping them together and to a stiffening angle $h^{35}$. The plates are not supported in the center from the corner-piece as in Figs. 40 and 41, because this is rendered unnecessary by the triangular ends of the plates which are provided with flanges $h^{36}$ at right angles to and abutting upon the flat faces of the plates.

The form of Fig. 43 is a further development of the form of Fig. 39, comprising a pair of triangular insets $h^{37}$ each having its right-angled corner depressed as shown at $h^{38}$ to receive the end of a cross-bar or strip $h^{39}$ which is secured to the plate $h^{40}$ bridging the interval between the two pieces $h^{37}$. The plate $h^{40}$ is nailed to strips $h^{39}$ of the proper length for the desired column.

Figs. 44 to 48 show boxed insets which are not only continuously adjustable, but can be made very strong and rigid with a minimum of metal. In Fig. 44 the inset is composed of two pieces $h^{41}$ of peculiar channel-shaped form, the middle limb of the channel being at an angle of 45 degrees with the top and bottom so as to rest flat upon the corner-piece. The ends of the channels overlap and are provided with slots $h^{42}$ through which pass bolts $h^{43}$ clamping them together in adjusted position. As stiffening means I provide a longitudinal central channel $h^{44}$ through the flanges of which the bolts $h^{43}$ also pass; and a sleeve $h^{45}$ on the bolt between the channel-flanges is shown to remove any bending stress from the channel.

The wood-and-iron form of Fig. 45 comprises two channel-shaped end-pieces $h^{46}$ and a rectangular wooden block $h^{47}$. The block $h^{47}$ need not be rectangular in shape, but this is the most convenient form. The end-pieces $h^{46}$ resemble the pieces $h^{41}$ of Fig. 44, except that their ends do not overlap and are not provided with slots but merely with holes through which are driven nails $h^{48}$ securing the parts together rigidly at their adjusted length. In order to reset the inset it is necessary to draw the nails $h^{48}$ and drive them in in a different place.

The form of Fig. 46 differs from that of Fig. 44 in that the independent channel $h^{44}$ is replaced by a box-shaped end $h^{49}$ turned on one of the end-pieces $h^{50}$ which replaces the piece $h^{41}$. In this case no sleeve $h^{45}$ is needed, and the piece $h^{50}$ is not provided with slots, hence the box $h^{49}$ is not in general in the center of the inset, but approaches nearer the center as the adjusted width increases. In the symmetrical form shown in Fig. 47, the two end-pieces $h^{51}$ have each a channel-shaped flange $h^{52}$ on the end, and free bolts $h^{53}$, surrounded if considered desirable by a sleeve $h^{54}$, said bolt passing through slots $h^{55}$ in the respective pieces. This form is extremely strong as involving three separate points of intermediate connection between the two faces of the inset, and these are always symmetrical with respect to the center of pressure.

The form of Fig. 48 is similar to that of Fig. 45 except that the wooden block $h^{47}$ and one of the pieces $h^{46}$ are replaced by a single wooden block $h^{56}$ having one or both ends cut on a bevel.

The longitudinal adjustment of my adjustable inset takes place in a manner similar to that already described in connection with the side and corner-pieces, namely by using sections of different length except for a small portion at the top for which overlying plates are used. Two styles of these are shown in Figs. 49 and 50 respectively. The plates $i'$ of Fig. 49 have flanges $i^2$ turned on their ends, which engage under the edges of the inset and are thus held in place. It is not therefore necessary to secure them together in the center, as it will be understood that they are only put in place after the rest of the column is poured, and being at the top where they can be reached by the men pouring the concrete are readily prevented from becoming displaced if either should have any tendency to do so. Fig. 50 shows a pair of plain plates $i^3$ which are secured adjustably together by a bolt $i^4$ passing through slots $i^5$ at intervals. Any desirable means, such as a wire passed through the slot $i^5$ may be used for holding this in position.

Fig. 51 shows a diagonal section through a corner provided with corner-pieces of Fig. 29, the inset of Fig. 45 and the extension-plates of Fig. 49 at the top.

In all these figures it should be understood that the thickness of the metal will in general be negligible and therefore is much exaggerated in the drawing for the sake of perspicuity. The thickness of the metal will therefore not interfere with the substantially flush setting of the bars together, and will not form ridges or grooves in the concrete of objectionable depth.

Figure 52:
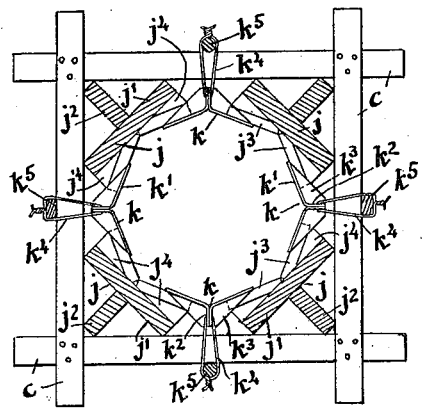

In Figs. 52 to 57 inclusive are shown several forms of my special octagonal column-mold. All of these are adapted to be used with the frame-bars $c$ the same as used with the square column-mold as shown. The first form, Fig. 52, comprises four corner-pieces $j$ and four side-pieces $k$. The four side-pieces are here each composed of a facing-plank $j^1$ and a backing-plank $j^2$ set edgewise and thus similar in construction and design to the side-pieces of the column-mold as previously described. They have, however, either permanently or temporarily secured to their faces oblique planks $j^3$, which meet at the center at an angle of 135 degrees and may be supported by triangular blocks $j^4$. The side-pieces in this case comprise each a sheet of metal $k'$ creased along the center at an angle of 135 degrees as shown in Fig. 52 and having a longitudinal fold $k^2$ along the angle and the sheet being rigidified by gussets or flanges $k^3$ set edgewise. The sheet $k'$ rests upon the faces of the planks $j^3$, the gussets $k^3$ sliding in grooves or open spaces between the planks, which are as described in the case of the corner and side-pieces for the square column-mold. The edge-planks $j^2$ are of such length as to rest in the corner of the frame-bars $c$ when the edges of the plank $j^1$ rest on the sides of said bars, and the side-pieces will fill up the open spaces between the corner-pieces, being secured in position by cords or wires $k^4$ passed through holes or otherwise secured to the side-pieces and around longitudinal strips or rods $k^5$. It will be seen therefore that an exact octagon is formed simply by setting the frame-bars to the required size.

In Fig. 53 is shown a similar construction made entirely of metal, the corner-pieces being constructed of a single metallic sheet $j^6$ in the form of the same T-shaped outline as in Fig. 52, the faces of said sheet forming angles of 135 degrees and having planks $j^7$ secured thereto. An alternative form of somewhat different design is shown on a larger scale in Fig. 58 and as there shown the planks $j^7$ are secured to the faces of the sheet by screws $j^8$ which are screwed in through holes in the sheet in the back before the sheet is riveted up.

Figure 54:
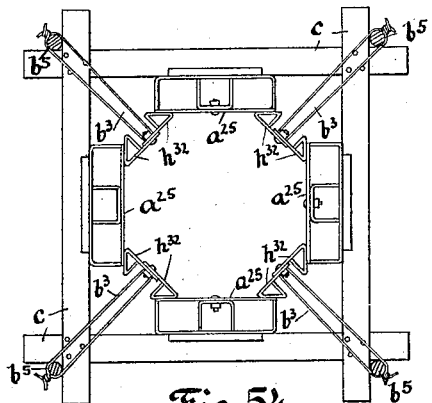

In Figs. 52 and 53 the octagon is set with diagonals parallel to the frame-bars, whereas in Figs. 54 to 57 the sides are parallel thereto. The form of Fig. 54 is an extension of the square column-mold, side-pieces $a^{25}$ of the form shown in Fig. 12, being used; but any other of the forms used for the square-column may be used instead thereof. In the corners between these side-pieces are placed adjustable insets of one of the forms shown in Figs. 38 to 48, the side-edges of these insets resting upon the faces of the side-piece $a^{25}$. The inset shown in Fig. 54 is substantially that of Fig. 42. In this column-mold, in order to get an exact octagon, it is necessary, in addition to setting the frame-bars at the right dimensions, to adjust the width of the inset-pieces.

Figure 55:
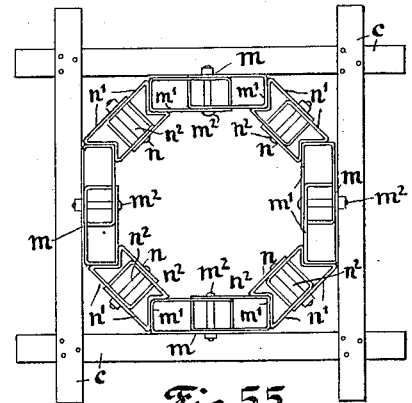

In Fig. 55 the side-pieces $m$ are made up of four adjustable metal-planks and four adjustable diagonal corner-pieces $n$, of the same size, but somewhat different form. The plank $m$ is made up of two telescoping sections $m'$ united by a bolt $m^2$, and the corner-piece $n$ of two sections $n'$ united by a bolt $n^2$. In this construction it is necessary, in addition to adjusting dimensions of the frame-bars $c$, to adjust also the width of the adjustable plank $m$ and of the corner-pieces $n$ to the proper dimension; but the frame parts may if desired be omitted and the form held in shape by a spirally wrapped wire or cord, as it will hold its own shape independently of the frame-bars.

Figure 56:
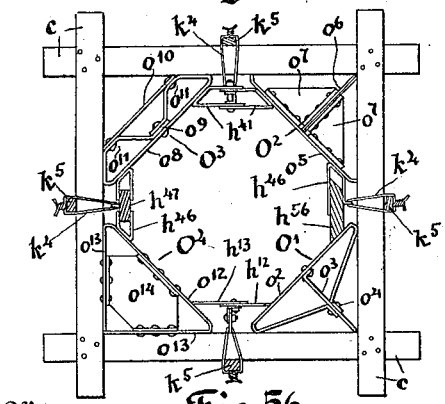

The form of Fig. 56 comprises flat corner-pieces, which are here shown in four different forms, designated respectively $O'$, $O^2$, $O^3$ and $O^4$; and four of my adjustable insets, Figs. 38 to 48, which are also shown in four different forms. It is to be understood that in general only one form of corner-piece and one form of inset will be used in a single column-form, the different varieties here shown in the same column-form being merely for the sake of economizing space. The corner-pieces are so constructed that, as in Fig. 52 they rest on the sides and corner of the frame-bars; but they differ from the form of Fig. 52 in having each a flat face which makes an angle of 45 degrees to the frame-bars. While they may be constructed of wood, as in Fig. 52, I have here shown all four constructed of metal. The form $O'$ comprises a plate $o^2$ forming the facing and a stiffening plate $o^3$ forming the backing and riveted to the center of the plate $o^2$, while the ends of the latter are turned back and riveted to the stiffening plate at $o^4$. The form $O^2$ comprises a flat facing-plate $o^5$ and a flat stiffening-plate $o^6$, the two being secured together at intervals of their length by triangular gussets $o^7$. The form $O^3$ comprises a facing-plate $o^8$ having triangular boxed ends united together and to the center of the plate at $o^9$; and a second plate $o^{10}$ whose side-edges are riveted to the apexes of the triangularly boxed ends of the plate $o^8$ as shown at $o^{11}$. The form $O^4$ comprises a facing-plate $o^{12}$ having its sides bent over at $o^{13}$ and secured at intervals by transverse gusset-plates $o^{14}$ to the center of the plate $o^{12}$. In this construction, as in Fig. 54, two adjustments are necessary, namely the dimensions of the inclosing-frame and of the gussets between the corner-pieces.

Figure 57:
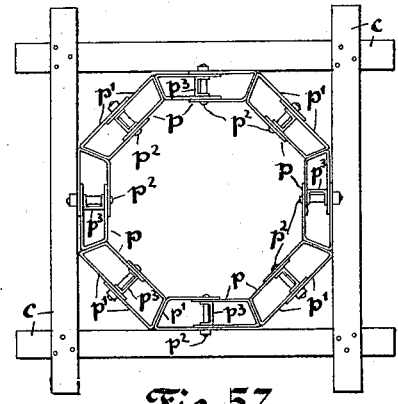

In Fig. 57 is shown a complete self-contained octagonal form made up of eight adjustable planks $p$ of the same type as the planks $m$ and $n$ being made of two trough-shaped sections $p'$ united at the center by a bolt $p^2$ and rigidified by a longitudinal central channel $p^3$; the side faces of these planks forming angles of $67\frac{1}{2}$ and $112\frac{1}{2}$ degrees with the front and back faces. This construction is adaptable to the formation of tapering columns, by the use of planks in which the sections are wider at the bottom than at the top. Because it is self-maintaining as to form, and the frame-bars $c$ may be replaced by encircling bands.

The adjustable plank described in connection with Figs. 55 and 57 forms an important element of my invention and may assume a great variety of forms.

My adjustable plank is also adaptable for use in connection with square columns, in which I may use four such planks having their side-faces beveled at an angle of 45 degrees and abutted edge to edge without any intervening corner-pieces. Such a construction is shown in Fig. 59. Within the frame $c$ are placed four side-pieces $s$ each composed of two boxlike members $s'$ having beveled end-faces $s^2$ which abut at the corners of the frame, and central bolts $s^3$ provided with sleeves $s^4$ and running in slots $s^5$ in the members $s'$, said bolts clamping the sections firmly together when set to the proper width. Three patterns of these pieces are here shown, that on the left of the figure having sections made from two sheets $s^6$, $s^7$, the first forming front and side-faces and the latter the back-face, and a diagonal web $s^8$ at a certain distance from the corner. The pattern shown at the top of the figure is similar except that the end of the sheet $s^7$ is bent at right angles as shown at $s^9$. The simpler pattern is suitable for small columns and the other for large ones. The webs $s^8$, $s^9$, while adding to the strength of the piece, diminish its length of adjustability.

In Figs. 63 to 67 is shown my special cylindrical column-mold. In this case I employ a sheet $t$ of sufficient flexibility to enable it to be rolled into a cylinder of varying diameter and having a row of bolt-holes $t'$ at one end, and a plurality of such bolt-holes arranged in two series $t^2$ and $t^3$ in the other end receiving bolts $t^4$ which hold the sheet to proper size. The bolt holes of the series $t^3$ lie half way between the bolt-holes of the series $t^2$, thus enabling a closer range of variation by choosing one or other series of bolt-holes. These sheets need not be made sufficiently strong to withstand the pressure at the bottom of the column but only for light pressure. For heavy pressure such as occurs at the bottom a spiral winding of wire $t^5$ may be used, the ends of said wire being secured to fasteners $t^6$ of any suitable pattern. The increased bursting strength of the mold will depend on the number of turns of wire. I also provide a series of holes $t^7$ along the top and bottom edges of the sheet for the attachment of guide cleats $t^8$ which hold the successive sections making up the column in line with one another. It will be understood that the holes $t^2$, $t^3$ and $t^7$ are too small to permit permanent leakage of the concrete, being plugged up by stones, etc., within a few moments after the concrete is poured in.

In order to make a fluted or other ornamental column I may use a correspondingly shaped inset $u$, shown in perspective in Fig. 66, which is set inside the sheet $s$ and rests thereagainst, the latter sustaining it against the bursting pressure from within. Said inset may therefore be made of thin metal as it has only to sustain the collapsing pressure against the flutings thereof, which on account of the small dimensions of the latter is of trifling importance.

From the aforesaid description it will be seen that my invention is adaptable to a great variety of forms, only comparatively few of which I have herein shown for the sake of illustration, but I consider all such forms included within the spirit and scope of my invention as indicated by the proper scope of my claims.

The octagonal column-mold of Figs. 52 and 53 can be adapted for the use of square columns by making the corner-pieces with angles of 90 degrees instead of 135 degrees and by making the side-pieces flat. The backing-plank $j^2$ of Fig. 2 and the corresponding stiffening-flange of the piece $j^6$ would in such cases be omitted.

Fig. 68 shows how an octagonal column may be formed according to the combination of Fig. 2. In this figure the use of the adjustable corner-pieces of Fig. 17 and the adjustable side-pieces is illustrated, the former being drawn out sufficiently to make the diagonal sides or corner-bevels equal in width to the other sides. The corner-pieces may be supported intermediately if found desirable from the corners of the frames, by struts $b^{60}$, replacing the struts $b^{10}$ of Fig. 4 and $j^2$ of Fig. 52 as shown.

Having thus described my invention, what I claim as new and desire to secure as Letters Patent is:

1. A column-mold, comprising an outer frame, side-pieces bearing thereagainst, and corner-pieces separate from and independent of said side-pieces, said side-pieces and said corner-pieces having interfitting recesses and flanges.

2. A column-mold, comprising an outer frame, side-pieces supported thereby, and corner-pieces separate from and independent of said side pieces, said side-pieces and said corner-pieces having interfitting recesses and flanges and being laterally adjustable.

3. A column-mold, comprising an outer frame, side-pieces extending longitudinally of the mold and supported by said frame, corner-pieces separate from and independent of said side pieces and laterally adjustable with respect thereto, and means for bracing said corner-pieces to resist outward pressure.

4. In a column-mold, a side-piece comprising a facing-plank extending longitudinally of the mold parallel to the face of the column, and a backing-plank secured edgewise thereto and provided with recesses or apertures to receive the members of a supporting frame.

5. In a column-mold, the combination of a side-piece having recesses in its inner face, and a corner-piece provided with tongues or flanges to engage said recesses.

6. In a column-mold, the combination of a side-piece having recesses in its inner face, and a corner-piece consisting of a sheet adapted to slide on said inner face and stiffening-flanges on the back arranged in position to be received in said recesses.

7. A column-mold comprising, in combination, a plurality of side-planks in the center of the sides of said mold, each side-plank having a plurality of recesses on the sides of its inner face, and a plurality of angular corner-pieces alternating with said side-planks, each comprising a sheet-metal member whose edges rest upon the inner faces of two adjacent side-planks and which have transverse stiffening ribs on the back thereof which are received in said recesses.

8. A column-mold comprising, in combination, a plurality of side-planks in the center of the sides of said mold, each side-plank having a plurality of recesses on the sides of its inner face, a plurality of angular corner-pieces alternating with said side-planks, each comprising a sheet-metal member whose edges rest upon the inner faces of two adjacent side-pieces and which has transverse stiffening ribs on the back thereof which are received in said recesses, and a plurality of frame-bars united together in quadrilateral form and surrounding said side and corner-pieces.

9. A column-mold comprising, in combination, a plurality of side-planks in the center of the sides of said mold, each side-plank having a plurality of recesses on the sides of its inner face, a plurality of angular corner-pieces alternating with said side-planks, each comprising a sheet-metal member whose edges rest upon the inner faces of two adjacent side-pieces and which has transverse stiffening ribs on the back thereof which are received in said recesses, a plurality of frame-bars united together in quadrilateral form and surrounding said side and corner-pieces, and means for adjustably uniting the ends of said frame-bars in variable positions to form different sizes of column.

10. A column-mold comprising, in combination, a plurality of side-planks in the center of the sides of said mold, each side-plank having a plurality of recesses on the sides of its inner face, a plurality of angular corner-pieces alternating with said side-planks, each comprising a sheet-metal member, whose edges rest upon the inner faces of two adjacent side-pieces and which has transverse stiffening ribs on the back thereof which are received in said recesses, a plurality of frame-bars united together in quadrilateral form and surrounding said side- and corner-pieces, means for adjustably uniting the ends of said frame-bars in variable positions to form different sizes of column, and means at the angles between said frame-bars for holding them in rectangular relation.

11. In a column-mold, a longitudinally extending side-piece of T-shaped cross-section comprising a facing-plank set flatwise to the face of the column and a backing-plank set edgewise thereof, each of substantially the same length, a second similar facing-plank and a second similar backing-plank each equal to the difference between the required column-length and the length of said first facing- and backing-piece; the two facing-pieces being set end to end and the two backing-pieces also end to end but in reverse position so that the long backing-piece is at the opposite end of the column from the long facing-piece.

12. In a column-mold, a sectional adjustable corner-piece for paneled corner-columns in two parts, each formed of a sheet folded longitudinally the two parts forming the angle between the face and beveled corner of the column, the beveled portions of the two sheets sliding one over the other, a stiffening-flange secured edgewise to the back of the outermost sheet on the two faces thereof, a stiffening flange secured to the other sheet, a tongue projecting from said last-named stiffening-flange and overlapping said first named stiffening-flange, a bolt or bolts passing through a slot or slots in one of said flanges and an opening or openings in the other and securing the two adjustably together.

In witness whereof, I have hereunto set my hand this fourth day of May, 1908.

RUDOLPH B. HARTMAN.

Witnesses:
GEORGE WETMORE COLLES,
C. A. A. McGEE.

Copies of this patent may be obtained for five cents each, by addressing the "Commissioner of Patents, Washington, D. C."